Figure 1:
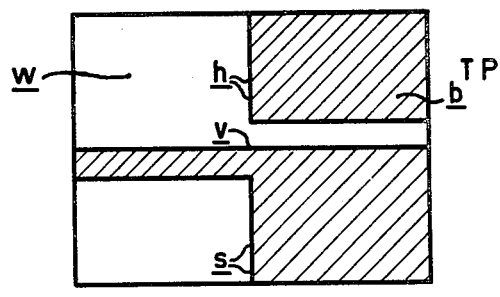
Figure 1:
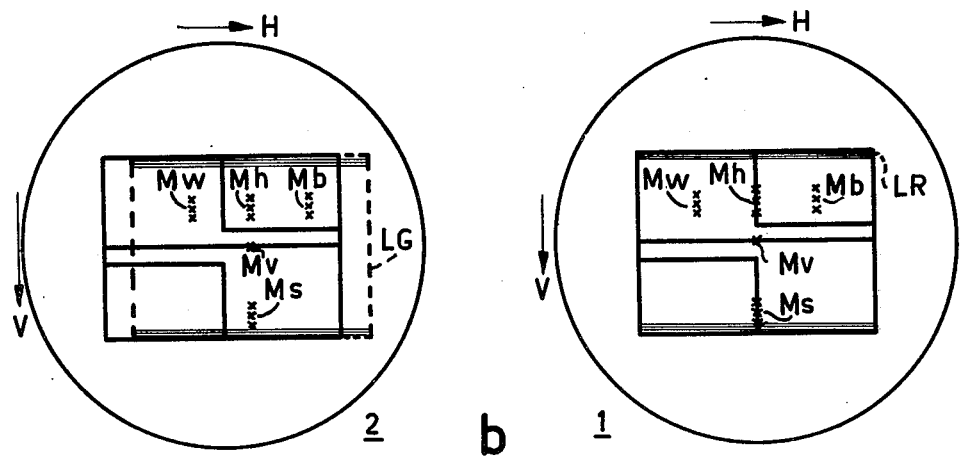
Figure 1:
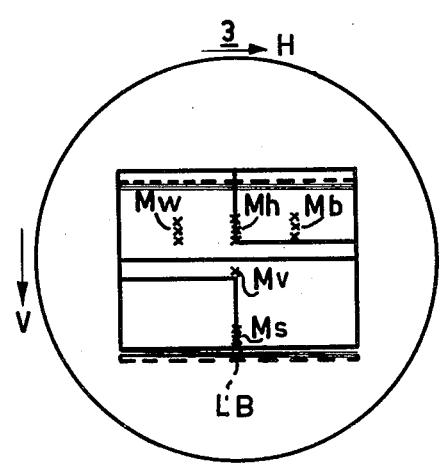

United States Patent [19]

Robers

[11] 3,987,482
[45] Oct. 19, 1976

[54] METHOD OF POSITIONING LINE SCANNING RASTERS IN A COLOR TELEVISION CAMERA AND DEVICES SUITABLE FOR CARRYING OUT THIS METHOD

[75] Inventor: Klaas Herman Jan Robers, Eindhoven, Netherlands

[73] Assignee: U.S. Philips Corporation, New York, N.Y.

[22] Filed: Dec. 10, 1974

[21] Appl. No.: 531,328

[30] Foreign Application Priority Data
Jan. 30, 1974  Netherlands.............. 7401243

[52] U.S. Cl.................................. 358/51; 358/10
[51] Int. Cl.²........................................ H04N 9/09
[58] Field of Search............................ 358/10, 51; 178/DIG. 36

[56] References Cited
UNITED STATES PATENTS

| | | | |
|---|---|---|---|
| 2,611,816 | 9/1952 | Darke, Jr. | 358/51 |
| 3,404,220 | 10/1968 | Favreau | 358/51 |
| 3,609,219 | 9/1971 | Diehl | 358/51 |
| 3,692,918 | 9/1972 | Olson et al. | 358/51 |
| 3,705,839 | 12/1972 | Taylor | 358/51 |

*Primary Examiner*—Benedict V. Safourek
*Assistant Examiner*—Aristotelis M. Psitos
*Attorney, Agent, or Firm*—Frank R. Trifari; Henry I. Steckler

[57] ABSTRACT

When adjusting a color television camera a specific test pattern comprising dark and bright areas is used which is placed in the ambient light of a scene to be taken. By means of measuring locations in line scanning rasters the black level and the peak-white value in the test pattern signals are fixed at reference values. Thus the picture signals are given the nominal values matching the ambient light. Then other measuring locations are moved, by scanning raster displacement and/or scanning raster shaping, to bright-dark transitions in the image of the test pattern at which an intermediate reference value is provided. Absolute scanning raster positioning is carried out without being influenced by non-linearities, in contradistinction to the case when using a reference scanning raster.

11 Claims, 7 Drawing Figures

METHOD OF POSITIONING LINE SCANNING RASTERS IN A COLOR TELEVISION CAMERA AND DEVICES SUITABLE FOR CARRYING OUT THIS METHOD

The invention relates to a method of positioning line scanning rasters in a colour television camera using a plurality of line scanning rasters which each lead to a picture signal, which picture signals, which correspond to a common test pattern, by means of signal comparison give an adjustment signal in the case of incorrect positioning of the line scanning raster to eliminate the resulting misregistration of the rasters in picture signal display, and to devices suitable for carrying out said method.

U.S. Pat. No. 3,700,789 describes a colour television camera in which steps have taken for effecting registration correction of scanning rasters. It is proposed to apply a common test pattern for the scanning rasters which includes oblique light-shade transitions; the term "oblique" is used to mean: being at an angle to the line and field scanning directions which differs from a right angle. A test pattern is applied which includes four triangular areas which are distributed over the picture area, the apices pointing in a direction opposite to the line scanning direction. Two line scans are carried out across each triangle, one in the upper part and the other in the lower part, reckoned in the raster scanning direction, so that locally two relevant signal transitions are obtained. The two signal transitions of a triangle in one of the two rasters to be brought into registration with one another are compared to those in the other of the two rasters. For this purpose the instants of occurrence of the various light-shade transitions relative to the instants of commencement of the line scans are determined by means of bistable multivibrators and thus an adjustment or error signal is obtained via gate circuits for displacing the line or field scanning direction of the latter scanning raster relative to the former one which is used as a reference. As has been mentioned hereinbefore, an essential feature is that the test pattern includes oblique light-shade transitions, because otherwise no registration correction displacement in both the line and field scanning directions is possible.

The method described is based on picture signal comparison between two scanning rasters having a common test pattern of specific design, one raster being used as a reference with which the other is brought into registration. A disadvantage of this method is that achieving raster registration is rendered very difficult by the fact that the scans in the scanning rasters invariably are non-linear in a greater or lesser degree, the non-linearities being particularly marked outside the central area, for it is attempted to effect raster registration by comparing picture signals which are distorted by non-linearities and one of which is considered as a reference.

It is an object of the present invention to provide a method, and an equipment suitable for carrying out the method, while enable a plurality of line scanning rasters to be correctly positioned and are based on a completely different principle and do not suffer from the afore-mentioned disadvantage. For this purpose the method according to the invention is characterized in that, in producing picture signals which correspond to a test pattern having a dark and a bright area and a bright-dark transition, in the dark and bright areas at a first and a second measuring location respectively in the line scanning raster the signal value of the picture signal is put at a first and a second reference value reespectively, whereupon a third reference value, which substantially lies midway between the said first and second reference values, at a given measuring location which is fixed in the line scanning raster for ultimately deriving the adjustment signal is used for displacing the latter measuring location and hence the entire line scanning raster to the said bright-dark transition given by the test pattern.

A device according to the invention is characterized in that it is provided with a comparison circuit to which the picture signal is applied in which circuit the said first, second and third reference values are present, at least one output at which an adjustment signal is produced being connected to circuits for fixing the first and second reference values in the picture signal and to circuits for shifting the position of the line scanning raster, the device further comprising a control pulse source which is connected to the said comparison circuit for controlling it.

The invention is based on the recognition that, instead of mutual picture signal comparison with the inherent disturbing influence of non-linearities, absolute positioning can be achieved for each individual scanning raster by first putting two signal levels in the picture signal each on a reference value and subsequently comparing the third intermediate reference value associated with a measuring location in the line scanning raster with the picture signal so as to produce an adjustment signal until the measuring location is exactly put at the centre of the transition in the test pattern which corresponds to the third reference value.

Figure 2:
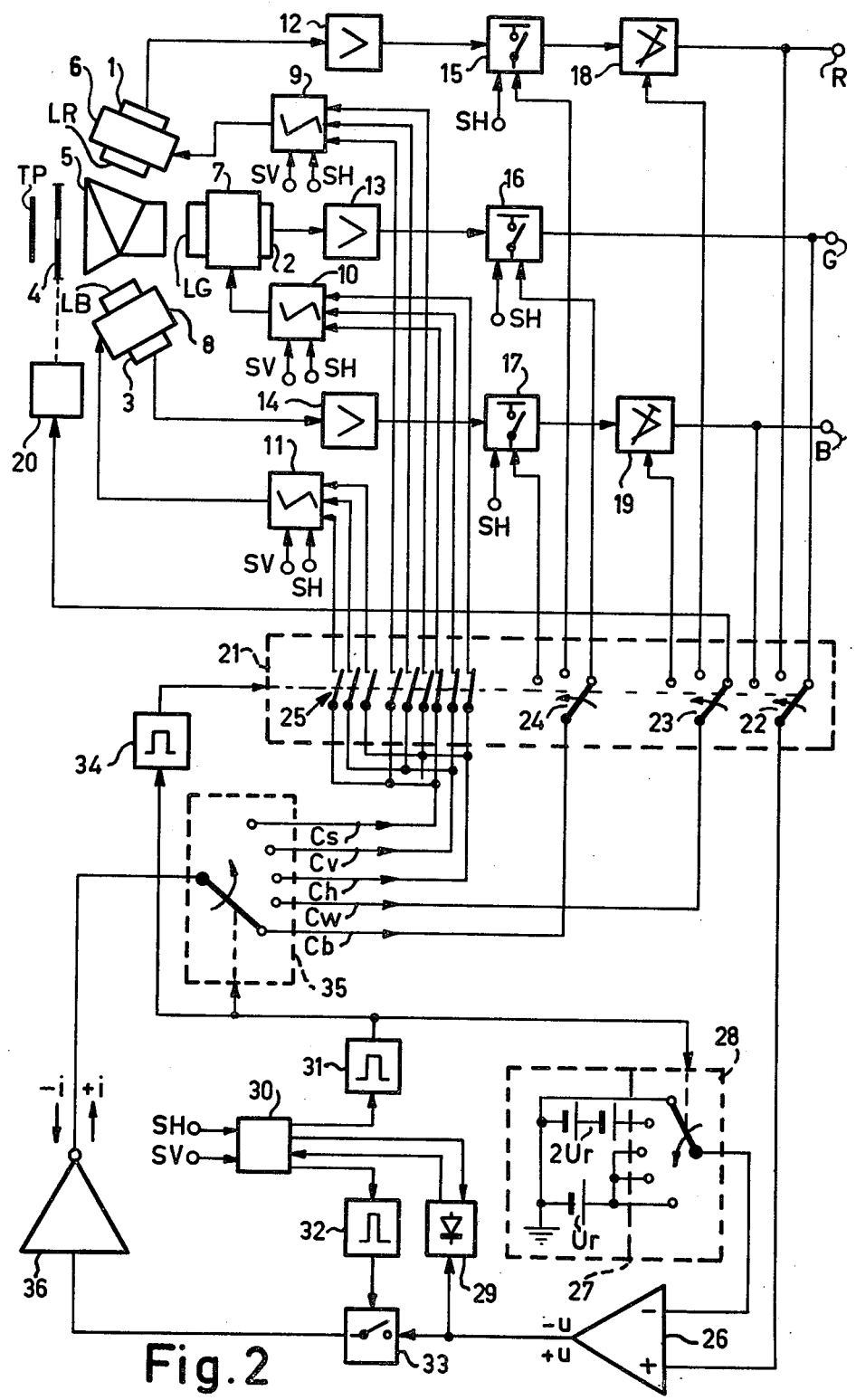
Figure 3:
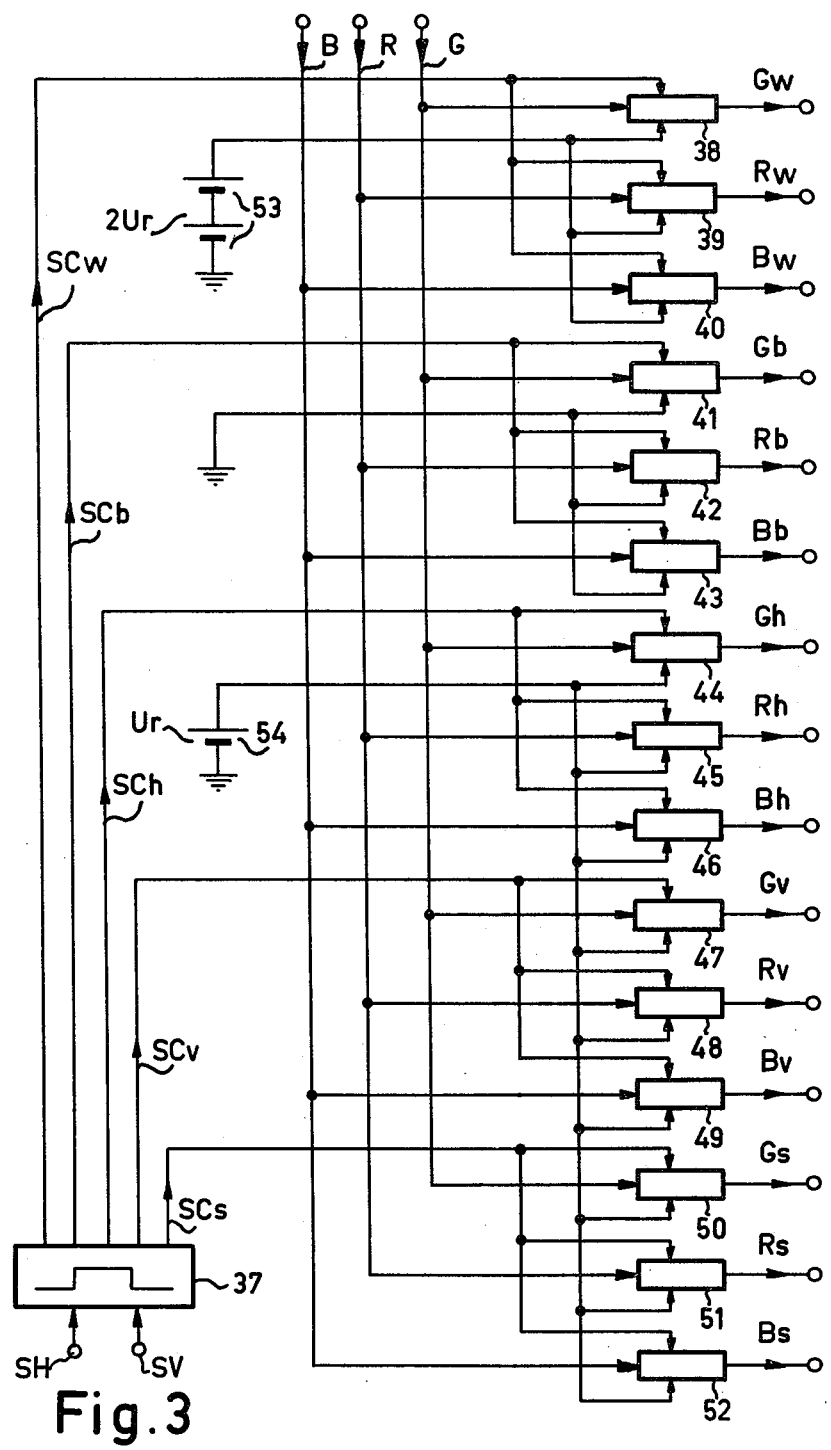
Figure 4:
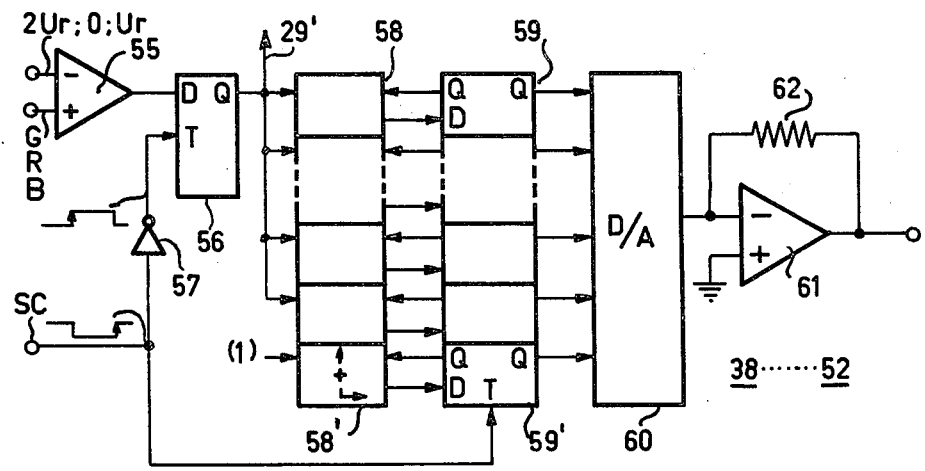
Figure 5:
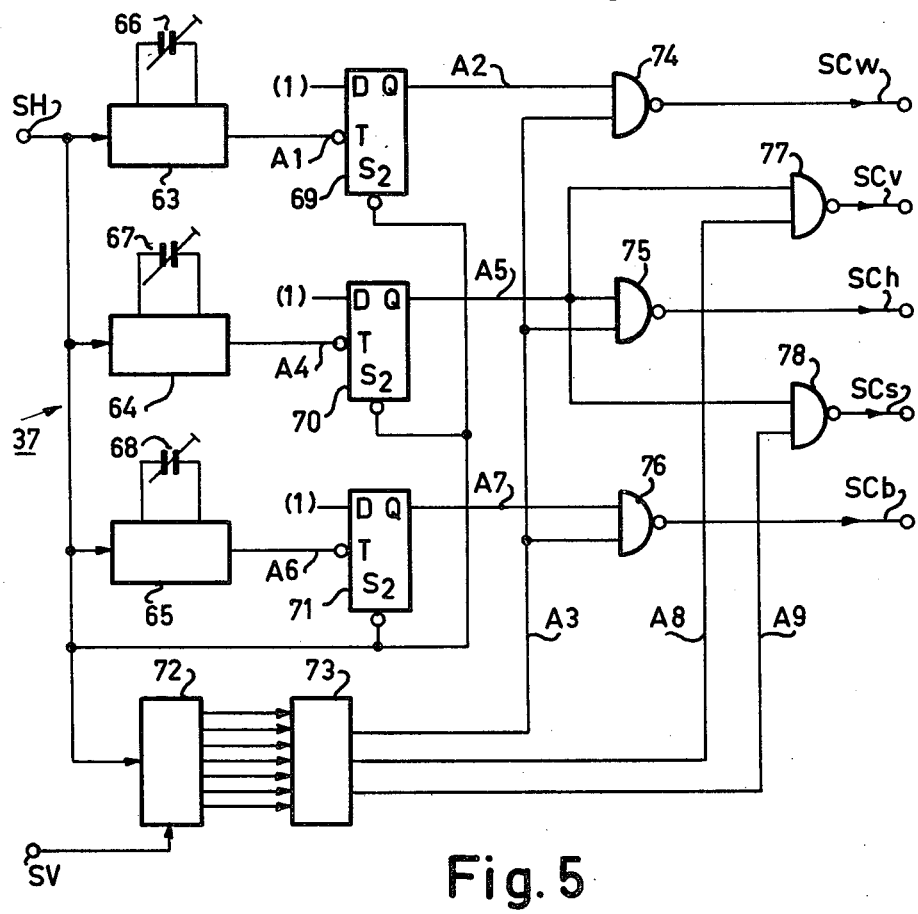
Figure 6:
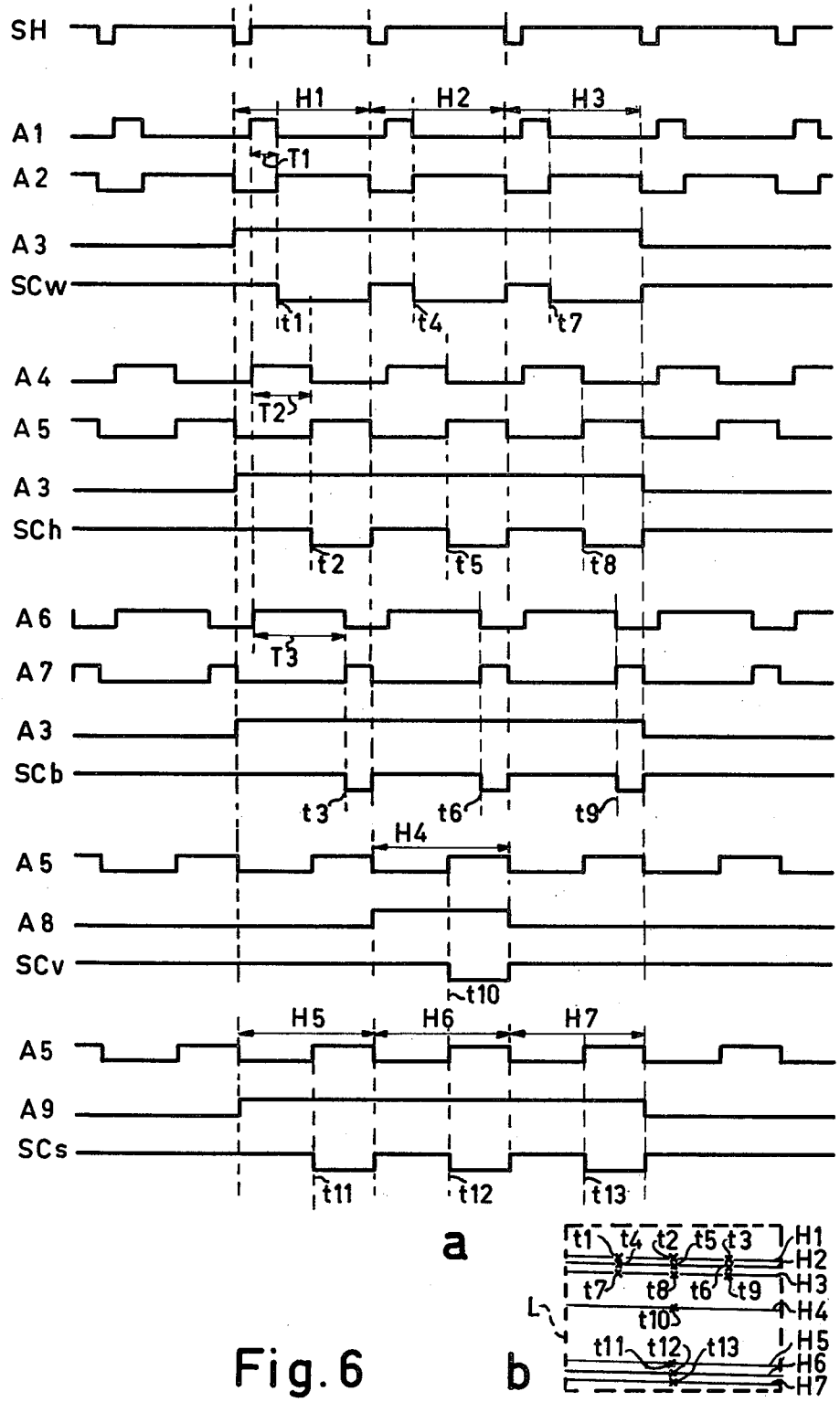

Embodiments of the invention will now be described, by way of example, with reference to the accompanying diagrammatic drawings, in which:

FIG. 1 shows in FIG. 1a a test pattern suitable for use in the method according to the invention and in FIG. 1b line scanning rasters including measuring points, FIG. 2 is a block schematic view of a colour television camera provided with equipment according to the invention, FIG. 3 shows a second embodiment of the equipment, FIGS. 4 and 5 show in more detail parts of the equipment of FIG. 3, and FIG. 6 shows in FIG. 6a signal wave forms produced in the equipment of FIG. 5 and in FIG. 6b a line scanning raster.

Referring now to FIG. 1, FIG. 1a shows a test pattern TP and FIG. 1b shows line scanning rasters LG, LR and LB. The line scanning rasters L are each formed, for example, in a pickup tube by an electron beam which scans a target. Such a target typically consists of an electrically conductive transparent signal plate fed via a resistor and a semiconductor layer the free surface of which is scanned by the electron beam according to lines and fields. During to local leakage influences in the semiconductor layer which are determined by photons an optical image of the test pattern TP formed on the target produces a corresponding potential image on the free surface of the semiconductor layer. By the electron beam scanning inn the line scanning rasters L the potential image is converted into a picture signal which appears at an output of the camera tube which is connected to the signal plate. Instead of a plurality of pickup tubes each having a separate line scanning raster L a single pickup tube having three line scanning rasters L may be used. Furthermore instead of pickup tubes having targets, which may be in the form of discrete diodes, solid-state image sensors may be used in which a line scanning raster is formed, for example, in a cross-bar system.

The line scanning rasters LG, LR and LB are used in a colour television camera which is shown schematically in FIG. 2 and comprises three pickup devices 1, 2 and 3 the structure of which is irrelevant per se, however, in the camera shown in FIG. 2 they take the form of pickup tubes. It is assumed that interlaced scanning is employed in the usual manner, so that two successive line scanning rasters L correspond to one television picture. The light emanating from the test pattern TP is processed in the camera via a diaphragm 4 and a light splitter 5 and split into three fundamental components red R, green G and blue B and projected onto the targets of the pickup devices 1, 2 and 3 according to the respective scanning rasters LR, LG and LB. Thus the monochrome or black-and-white test pattern TP is common to all three line scanning rasters L. FIG. 1b shows external elevations of the targets of the pickup devices 1, 2 and 3. It will prove of importance that the test pattern TP is illuminated by the ambient light at the location of the scene to be televised. The test pattern TP may be a transparency, or the ambient light is reflected at the test pattern TP. The test pattern TP may be mounted in a separate holder which during adjustment is placed on the camera, or the test pattern TP may be mounted in the camera to be inserted into the path of the light during adjustment.

In FIG. 1a dark or black areas in the test pattern TP are shaded. A black area is designated by b and a bright or white area is designated by w. Three bright-dark transitions are designated by h, v and s respectively. An essential requirement is that the bright-dark transitions in the test pattern TP extend in two directions are right angles to one another (h and s relative to v). A comparison of the positions of the images of the test pattern TP and the line scanning rasters L on the pickup devices 1, 2 and 3 of FIG. 1b provides the following results. The bright-dark transitions extend in a line scanning direction H and in a field scanning direction V which, as is usual in television, correspond to the horizontal and vertical directions respectively. The line scanning raster LR is in register with the potential image of the test pattern TP on the target, whilst the line scanning rasters LG and LB are displaced in the horizontal and vertical directions respectively relative to the potential image of the test pattern TP. Instead of the misregistration shown by way of example in FIG. 1b vertical and horizontal misregistrations may occur simultaneously. Furthermore, in contradistinction to what is shown for simplicity in FIG. 1b, the size of the potential image of the test pattern TP need not be equal to that of the line scanning rasters L, and in practice the size of the line scanning rasters L will be greater than that of the potential image to ensure that the potential image has no charged part which is not neutralized in the electron beam scanning. Also the relative positions and the sizes of the images of the test pattern TP on the pickup devices 1, 2 and 3 may be different.

Picture signal generation effected with the positions of the potential images of the test pattern TP and the line scanning rasters L shown in FIG. 1b would yield three picture signals which in display give an unacceptably distorted and discoloured television picture, for in display the information from the line scanning rasters L are superposed on one another so that a red-coloured partial picture (LR) is combined with a green-coloured partial picture (LG) which is displaced to the left and with a blue-coloured partial picture (LB) which is shifted upwardly. Hence position correction is required which is effected by the method according to the invention and will lbe described by way of example with reference to the colour television camera shown in FIG. 2.

In FIG. 2 the pickup devices 1, 2 and 3 are pickup tubes having deflecting, focussing and correcting means 6, 7 and 8 respectively which are fed from supply circuits 9, 10 and 11 respectively. The supply circuits 9, 10 and 11 each have a plurality of outputs (only one of which is shown for simplicity) connected to the means 6, 7 and 8, two inputs to which control signals SH and SV are applied and three inputs to which adjusting signals Ch, Cv and Cs described more fully hereinafter are applied. The control signals SH and SV correspond to, or are derived from, the line and field synchronizing signals respectively commonly used in television so that SH is the line control signal and SV is the field control signal.

Under the influence of the supply circuits 9, 10 and 11 and the means 6, 7 and 8 the pickup devices 1, 2 and 3 generate picture signals which are applied to signal amplifiers 12, 13 and 14 respectively. The amplifiers 12, 13 and 14 are connected to an input of a black level clamping circuit 15, 16 and 17 respectively. The circuits 15, 16 and 17 clamp a so-called black level being adjusted, for example, at each potential by an adjusting signal Cb applied to a second input. Furthermore, each circuit 15, 16 and 17 has the control signal SH applied to it which includes clamping pulse which in the picture signal determine the instant of black-level introduction during the line blanking periods. The circuits 15 and 17 are connected to inputs of variable amplifying circuits 18 and 19 respectively. The circuits 18 and 19 fix a peak white value in the picture signal at a nominal value owing to an adjusting signal Cw applied to them. An example of peak white value is 1 volt in the case of a black level at earth potential.

After adjustment, owing to the action of the black level circuit 15 the circuit 18 at its output produces a picture signal R at the nominal peak-to-peak value, and similarly the circuits 17 and 19 produce a picture signal B. A nominal picture signal G is obtained via a diaphragm control instead of via an amplifier circuit, for which purpose the diaphragm 4 is connected to a motor and associated motor control circuit 20 to which the adjusting signal Cw is applied for control. During adjustment, the aperture of the diaphragm 4 is made so large by the signal Cw that the peak-white value in the signal G is equal to the nominal value.

During adjustment, the adjusting signals Cb, Cw, Ch, Cv and Cs are generated by using the picture signals R, G and B when the test pattern TP of FIG. 1a is sensed by the camera of FIG. 2. In the design of a camera as shown in FIG. 2 the various adjusting signals C are successively derived from the test pattern signal G, from the test pattern signal R and from the test pattern signal B. For this purpose the test pattern signals G, R and B are applied to a composite switch 21 to which are also applied three adjusting signals C derived from the test pattern signals, to be sequentially applied to the circuits 9, 10 and 11, and 15 to 20. For clarity, the composite switch 21 is shown as comprising mechanical switches, but in practice electronic switches are used. In the composite switch 21, the test pattern signals G, R and B are applied to three selection contacts of a switch 22. Two selection contacts of a switch 23 are connected each to an input of circuits 18 and 19 respectively whilst one selection contact is connected to the motor control circuit 20. Three selection contacts of a switch 24 are connected each to an input of a black level clamping circuit 15, 16 and 17 respectively. A switch 25 has three triple selection contacts, the three groups of three selection contacts each being connected to three inputs of the supply circuits 9, 10 and 11 respectively. In contradistinction to the switches 22, 23 and 24 the switch 25 does not have a single pole but three poles adapted to be connected to the circuit 9, 10 or 11 respectively.

The pole of the switch 22 is connected to a (+) input of a signal comparison device 26 provided with an inverting (−) input which is connected to a switchable reference voltage source 27. The switchable reference voltage source 27 comprises a switch 28 and a reference voltage source which is connected to change-over terminals of the switch 28 so as to deliver earth potential at a first change-over terminal, a voltage having a reference value 2 Ur at a second change-over terminal and a voltage having a reference value Ur at each of the three further change-over terminals. Assuming the given values of earth potential and 1 volt as nominal values for the picture signals G, R and B we have: 2 Ur = 1 volt and Ur = 0.5 volt. The signal comparison device 26 delivers a positive voltage $+u$ if the voltage at the (+) input is higher than that at the (−) input, and a negative voltage $-u$ if the voltage at the (+) input is lower than that at the (−) input. The switchable reference voltage source 27 and the signal comparison device 26 thus form a comparison circuit (26–28). The appearance of exactly equal voltages at the (+) and (−) inputs results in an indeterminate condition ($+u$ or $-u$) which is not of importance, as will be shown hereinafter.

The output of the signal comparison device 26, which forms part of the comparison circuit (26–28), is connected to an input of a signal detector 29. A second input of the signal detector 29 is connected to an output of a control pulse source 30 whilst the output of the detector 29 is connected to an input of the control pulse source 30. Control signals SH and SV are applied each to one of two further inputs of the control pulse source 30. A second and a third output of the control pulse source 30 are connected to switching signal generators 31 and 32 respectively. For control, the generator 31 is connected to the switch 28 and the generator 32 is connected to an on-off switch 33. The generator 31 is also connected to a switching signal generator 34 for controlling the composite switch 21 and to a switch 35. The on-off switch 33 is connected between the output of the signal comparison device 26 and the input of a signal amplifier or voltage-to-current converter 36. The converter 36 supplies to the pole of the switch 35 a current $-i$ or $+i$ according to whether the voltage at the input is $+u$ or $-u$ respectively. The switch 35 has five change-over terminals; a terminal for the signal Cb is connected to the pole of the switch 24, a terminal for the signal Cw is connected to the pole of the switch 23 and three terminals for the signals Ch, Cv and Cs are connected to the three poles of the switch 25.

The operation of a colour television camera provided with an adjustment device (21–36) as shown in FIG. 2 will now be described with reference to FIG. 1. It is assumed that the camera of FIG. 2 is required to be made ready for use, that is to say it must be adjusted or re-adjusted for sensing a scene. For this purpose, first the camera is focussed onto the test pattern TP of FIG. 1a in the ambient light of the scene. It is assumed that in the test pattern signals produced the black level deviates from earth potential, the peak-white value is not equal to the nominal value, and the potential images of the test pattern TP on the pickup devices 1, 2 and 3 and the line scanning raster LR, LG and LB are situated as shown in FIG. 1b. During adjusting the camera of FIG. 2 first operates with the test pattern signal G as shown in FIG. 2. The test pattern G is applied via the switch 22 to the (+) input of the signal comparison device 26 which, depending upon the instantaneous signal value and upon the value of the reference voltage applied to the (−) input, delivers either a voltage $+u$ or a voltage $-u$. The switches 28 and 35 can be switches in synchronism over the five change-over terminals under the control of the control pulse source 30 via the switching signal generator 31, and in the position shown in FIG. 2 the (−) input of the signal comparison device 26 is at earth potential and the switch 35 delivers the adjustment signal Cb to the black-level clamping circuit 16 via the switch 24.

In order to produce the adjustment signal Cb the switch 33 is closed at given instants. These instants correspond to the measuring points indicated by three crosses at a measuring location Mb as shown in FIG. 1b in the line scanning raster LG. For this purpose a short-duration pulse by which the switch 33 is closed for, for example, a few tenths of a microsecond is generated by the generator 32 under the control of the control pulse source 30 which causes such pulses to be generated in three lines periods in the second half of the line scans and in the upper half of each line scanning raster LG (FIG. 1b). The measuring location Mb is situated in a dark or black region b of the image of the test pattern TP, so that in the test pattern signal G the earth potential should occur as the black level. If, as assumed, the test pattern signal G does not include earth potential but, for example, a higher potential, the positive voltage $+u$ appears at the output of the signal comparison device 26 at the instants (measuring location Mb) at which the switch 33 is in the closed condition. As a result, the converter 36 supplies the current $-i$ to the circuit 16. The black-level clamping circuit 16 may include, for example, a storage capacitor having a voltage which determines the black level in the (normal) picture signal G. In normal operation the clamping pulses in the line control signal SH impart a given voltage, which depends upon the storage capacitor voltage, to the image signal G during each line blanking period. The current $-i$ during adjustment results in that the storage capacitor voltage is decreased so that the black level also will be lowered. At each of the three measuring points of the measuring location Mb which occur in each line scanning raster LG the current $-i$ is generated and the storage capacitor voltage is reduced. The converter 36 may supply the current $i$ either as a pulsating current, which corresponds to opening and closing of the switch 33, or as a more or less constant current during a line period in that the converter 36 is provided with a hold circuit having a time constant equal to a line period. Discharging and charging continue until the black level (derived from the measuring location Mb) contained in the test pattern signal G applied to the (+) input of the signal comparison device 26 changes from a positive value to a negative one so that the signal comparison device 26 delivers the voltage $-u$. This voltage change (from $+u$ to $-u$) is detected by the signal detector 29 which then applies a stop signal to the control pulse source 30 to indicate that the black level in the test pattern signal G has just passed through (reference) earth potential. As a result, the control pulse source 30 stops activating the generator 32 and hence closing the switch 33 and starts activating the generator 31 so that the switches 28 and 35 switch from the first change-over terminal to the second change-over terminal.

The function of the signal detector 29 is to signal that the test pattern signal G (or R or B) has reached and even passed through the reference value derived from the source 27. If the black level in the test pattern signal G initially was almost equal to earth potential, the voltage change (from $+u$ to $-u$ or conversely) may take place at, for example, the first or second measuring point at the measuring location Mb, whereupon the detector 29 immediately stops the control pulse source 30 and causes the switches 28 and 35 to switch.

When the switches 28 and 35 are switched to the second change-over terminal the voltage of reference value 2 Ur is applied to the signal comparison device 26 in the comparison circuit (26–28), the control pulse source 30 closing the switch 33 at the instants which correspond to the three measuring points at measuring location Mw of the line scanning raster LG of FIG. 1b. Similarly to what has been described with reference to the black-level adjustment, a current $-i$ or $+i$ in the adjustment signal, Sw is supplied to the motor control circuit 20 until the reference value 2 Ur occurs in the test pattern signal G for the peak-white value in the bright or white region w of the test pattern TP of FIG. 1a.

Instead of first adjusting the black level and then the peak-white value, both the black-level adjustment and the peak-white adjustment may be carried out in one raster period of each line scanning raster L. In this process the measuring location Mb and Mw are used in each line scanning raster L.

After the reference values for the black level (0 volt) and for the peak-white value (2 Ur = 1 volt) have been introduced into the test pattern signal G, a position correction between the line scanning raster LG and the potential image of the test pattern TP on the pickup 2 can be performed. When performing this correction the switches 28 and 35 are switched to one of the three remaining changeover terminals, the reference value Ur = 0.5 volt being applied to the (−) input of the signal comparison device 26 in the comparison circuit (26–28) whilst the adjustment signal Ch, Cv or Cs is applied to the supply circuit 10. The adjustment signals Ch, Cv and Cs are derived by means of the measuring locations Mh, Mv and Ms respectively in the line scanning raster LG (or LR or LB) shown in FIG. 1b. The line scanning raster LG of FIG. 1b shows that at the measuring location Mh the black area b of the image of the test pattern TP is present. As a result, the (+) input of the signal comparison device 26 is at earth potential and the (−) input is at the reference voltage Ur = 0.5 volt. Consequently the voltage $-u$ appears at the output of the signal comparison device 26, and the converter 36 delivers the current $+i$ in the adjustment signal Ch which is applied to the supply circuit 10 for the means 7. In the supply circuit 10 a direct-current or direct-voltage component is added to the line deflection current or voltage so that the line scanning raster LG is displaced to the left, i.e. in a direction opposite to the line scan direction H. In one or more field periods the current $+i$ in the signal Ch produces a scanning raster displacement which in the final position corresponds to the position shown of the line scanning raster LR in FIG. 1b. In this raster the measuring location Mh is situated at the bright-dark transition h of the image of the test pattern TP. In this position of the measuring location Mh of the line scanning raster LG (or LR) the test pattern signal G (or R) contains the reference value Ur which lies midway between earth potential (black level) and the reference value 2 Ur (peak-white value).

If the measuring location Mh of a line scanning raster L is situated in the white area w of the image of the test pattern TP, the signal comparison device 26 will deliver the voltage $+u$ and the converter 36 will deliver the current $-i$ in order to displace the line scanning raster L in the line scanning direction H.

As has been stated when describing the generation of the adjustment signal Cb, the situation of the measuring location Mh at the dark-bright transition h of the image of the test pattern TP will involve a voltage change between the voltages $+u$ and $-u$, causing the detector 29 to give an indication of the correct positioning in the line scanning direction H.

In FIG. 1b the line scanning raster LB is vertically displaced relative to the potential image of the test pattern TP. With respect to the pickup device 3, the Figure shows that a measuring location Mv comprising a single measuring point lies in a black area. As a result, the adjustment signal Cv is generated so as to contain a current $+i$ for supply to the supply circuit 11 so that via the means 8 a vertical line scanning raster displacement is obtained until the line scanning raster LB has assumed a position as shown for the line scanning raster LR in FIG. 1b. When the line scanning raster LB comes into registration with the potential image of the test pattern TP on the pickup device 3, this is detected by the detector 29, causing the vertical scanning raster displacement to stop.

If interlaced scanning with the use of two successive line scanning rasters L corresponding to a single television picture is used, the measuring location Mv is not used for each line scanning raster L but only for every second line scanning raster L, i.e. once per television picture. This prevents the line scanning rasters L from being displaced alternatively upwards and downwards owing to the interlacing.

Subsequently the switches 28 and 35 are switched to the fifth change-over terminal so that the adjustment signal Cs is generated by means of a measuring location Ms in the line scanning rasters L of FIG. 1b. Because the horizontal and vertical position corrections have previously been performed, the line scanning raster LR of FIG. 1b will be discussed in more detail. The measuring location Ms is used to ascertain whether in the test pattern TP a bright-dark transition (s + h) which extends vertically coincides with the raster scanning direction V or is at an angle other than a right angle thereto, i.e. the raster scanning direction V is oblique. If this direction is oblique, the scanning raster L must be adjusted to the vertical position in order that in the ultimate display of the picture signal the vertical transition will be vertical. For this purpose it is ascertained whether the bright-dark transition s at the edge of the test pattern TP occurs in the potential image in the line scanning raster LR (L) at the measuring location Ms. If this is not the case, the adjustment signal Cs via the supply circuit 9 causes a sawtooth signal at field frequency to be applied to the line deflection means included in the means 6. The amplitude and the sign or direction of the field-frequency sawtooth signal then will be such that after one of a few line scanning rasters L the detector 29 detects the position of the measuring location Ms on the bright-dark transition s in the potential image of the test pattern TP on the pickup device 1. The oblique raster scanning direction V then has been corrected to extend in the desired vertical direction. During this oblique-distortion or skew correction the line on which the measuring location Mv lies does not change position.

After the test pattern signal G has been used in the camera of FIG. 2 for adjustment of the black level and the peak-white value, for the horizontal and vertical displacements and for the skew correction, the line scanning raster LG and the potential image of the test pattern TP have been brought into registration on the pickup device 2 of FIG. 1b. In these processes the switches 28 and 35 each have passed over their five change-over terminals and are switched to their first change-over terminals again, and the generator 34 applies a switching signal to the switch assembly 21. As a result, the test pattern signal R becomes available via the switch 22 for adjustment, whilst the adjustment signals Cw, Cb, Ch, Cv and Cs are applied via the switches 23, 24 and 25 to the circuits 18, 15 and 9 respectively. Instead of adjusting the diaphragm, as is done for the test pattern signal G, for the test pattern R (or B) the variable amplifier circuit 18 (or 19 respectively) is used to fix the peak-white value at the nominal value of, say, 1 volt. Otherwise adjustment for the test pattern signals R and B is identical to that for the test pattern signal G.

It is found that the adjusting device (21–36) enables the line scanning rasters LG, LR and LB to be positioned independently of one another. Because there is no reference scanning raster which the other scanning rasters are required to match and hence each scanning rasters is given an absolute instead of a relative position correction, no influence is exerted by the unavoidable nonlinearities in the scans on the correct position of each scanning raster viewed as a whole. An essential feature of the ultimate result of the method according to the invention is that first the black level and the peak-white value are fixed at two reference values and then the position displacements are effected by means of a reference value situated midway between the said two values.

After the abovedescribed adjustment steps the camera of FIG. 2 is ready for sensing the scene. The control pulse source 30 generates an end-of-adjustment signal, causing the adjustment equipment (21–36) to be switched off, for example in that the test pattern TP is removed from the path of the light, and an indication to be given to the camera operator. Owing to the storage effects in the circuits 9, 10, 11 and 15 to 19 the adjustments made are retained whilst in the motor control circuit 20 an automatic diaphragm control becomes in a known manner.

In the camera shown in FIG. 2 positioning correction is effected sequentially for the three line scanning rasters LG, LR and LB. Adjustment may alternatively be effected simultaneously. FIG. 3 shows an embodiment of a device which is suitable for the method according to the invention and is simultaneously operative for the three line scanning rasters LG, LR and LB. Another difference is that the storage effects assumed to be inherent in the circuits 9, 10, 11 and 15 to 19 of the camera of FIG. 2 form an integral feature of the device shown in FIG. 3. The five adjustments are performed simultaneously, the scanning raster position being correct only after the black level and the peak-white value have been put at the reference values. Prior to this, the position adjustments are only changed in the correct direction.

FIG. 3 shows a control pulse source 37 which on application of the control signals SH and SV generates switching signals SCw, SCb, SCh, SCv and SCs. The device of FIG. 3 comprises fifteen adjusting units 38 and 52 which each are shown as having three inputs and one output. With respect to the supply of the test image signals G, R and B, inputs of the units 38 to 52 are interconnected in three groups, a first group (38, 41, 44, 47, 50), a second group (39, 42, 45, 48, 51) and a third group (40, 43, 46, 49, 52). Furthermore corresponding inputs of the units 38, 39 and 40 are connected to one another and to a source 53 of a reference voltage of value 2 Ur and to the control pulse source 37 which supplies the switching signal SCw. At the outputs of the units 38, 39 and 40 signals Gw, Rw and Bw appear for adjusting and fixing thee peak-white value in the test pattern signals G, R and B respectively.

Corresponding inputs of the units 41, 42 and 43 are connected together to earth and to the control pulse source 37 which supplies the switching signal SCb respectively. At the outputs of the units 41, 42 and 43 signals Gb, Rb and Bb appear for adjusting and fixing the black level in the test pattern signals G, R and B respectively.

Corresponding inputs of the units 44 to 52 are connected to one another and to a source 54 of a reference voltage of value Ur. Corresponding inputs of the units 44, 45 and 46 are connected to one another and to the control pulse source 37 which supplies the switching signal SCh. At the outputs of the units 44, 45 and 46 signals Gh, Rh and Bh appear for adjusting and fixing horizontal displacements in the line scanning rasters LG, LR and LB respectively of FIG. 1b. Similarly the units 47, 48 and 49 are interconnected and on application of the switching signal SCv from the control pulse source 37 produce at their outputs signals Gv, Rv, and Bv for adjusting and fixing vertical displacements in the line scanning rasters LG, LR and LB respectively of FIG. 1b. Finally the units 50, 51 and 52 are interconnected so that on application of the switching signal SCs from the control pulse source 37 they produce adjustment signals Gs, Rs and Bs for adjusting and fixing skew corrections in the line scanning raster LG, LR and LB respectively of FIG. 1b. As will be seen, simultaneous application of the test pattern signals G, R and B and simultaneous use of the switching signals SCw, SCb, SCh, SCv and SCs cause the line scanning rasters LG, LR and LB to be simultaneously positioned. Thus the equipment of FIG. 3 includes a comparison circuit (38–54) in an adjusting device (37–54).

An embodiment of one of the adjustment units 38 to 52 of FIG. 3 is shown in FIG. 4. A switching signal SC replaces the said switching signals SCw to SCs. FIG. 4 shows a signal comparison device 55 having a (−) input to which are applied the reference value 2 Ur, earth potential 0 or Ur and a (+) input to which are applied the test pattern signals G, R or B. The output of the signal comparison device 55, which corresponds to the signal comparison device 26 of FIG. 2, is connected to the conditioned input of a flip-flop 56. The flip-flop 56 is of what is referred to as a D type and has a conditioned D input, a trigger input (T input) to which via a signal inverter 57 the switching signal SC is applied, and a Q output. The D flip-flop 56 is activated by ascending signal edges, i.e. descending signal edges in the switching signal SC. When the flip-flop 56 is activated its Q output takes over the logical value applied to the D input. With reference to the signal comparison device 26 of FIG. 2, for example, a logical 1 at the output of the signal comparison device 55 corresponds to the voltage $+u$ whilst a logical 0 corresponds to the voltage $-u$. At the Q output of the flip-flop 56 a logical 1 or 0 appears when an ascending trigger edge is applied to the T input whilst a logical 1 or 0 respectively is applied to the D input. A change in the logical value at the D input before or after the trigger edge does not influence the logical value at the Q output. Hence the D flip-flop 56 acts as a switch and as a memory, the Q output obtaining and retaining that logical value which is applied to the D input at the instant at which the trigger edge occurs. A comparison of the said voltage change between the voltages $+u$ and $-u$ in FIG. 2 which is detected by the signal detector 29 to derive a stop signal shows that for the same purpose the Q output of the flip-flop 56 may be connected to a detector 29', not shown. In this case the adjusting units 38–52 of FIG. 3 each include a signal detector 29'.

The Q output of the flip-flop 56 is connected to a plurality of inputs of a digital adding circuit 58. The circuit 56 comprises, for example, eight stages, resulting in an adding capacity of $2^8 = 256$. The inputs of seven stages are connected to the Q output of the flip-flop 56, and the logical 1 is applied to a stage 58' for the least significant bit. An input and an output of each of the stages of the circuit 58 are connected to a corresponding stage of a register 59 (for example 58' is connected to 59'). The stages of the register 59 each comprise a D flip-flop the D input and a Q output of which are connected to the corresponding stage of the adding circuit 58. The T inputs are interconnected and have the switching signal SC applied to them, whilst a further Q output of each stage of the register 59 is connected to a corresponding input of a digital-to-analogue converter 60 (D/A). The output of the converter 60 is connected to the (−) input of an operational amplifier 61 the (+) input of which is connected to earth whilst its output is fed back to its (−) input via a resistor 62.

The operation of the adjusting units 38 to 52 of FIG. 4 will now be described. If logical 0 appears at the Q output of the flip-flop 56, logical 1 will occur at the first stage 58' only of the circuit 58. It is assumed that a given binary number is present at the output of the circuit 58 so that at the Q outputs of the register 59 the same combination of logical 1 and 0 will appear except at the first stage 58'. If a logical 0 or 1 appears at the Q output of the stage 59', a logical 1 or 0 respectively appears at the D input of the stage 59' owing to the application of logical 1 to the stage 58'. An ascending trigger edge in the switching signal SC results in that logical 1 or 0 at the D input of the stage 59' is transferred to the Q output, whereas previously logical 0 or 1 respectively appeared at this output. Furthermore, in the stage 58' the always present logical 1 is added to the logical 1 or 0 delivered by the stage 59'. The sum signal becomes available at the D input of the stage 59', and also when two logical 1's are applied to the stage 58' a logical 0 is stored in the stage 58' and a logical 1 is transferred to the second stage of the circuit 58. If this contains a logical 1, further transfer to the third stage takes place, and so on. As a result, ultimately the binary number which appeared at the outputs of the circuit 58 and at the output of the register 59 is increased by one.

If however logical 1 appears at the Q output of the flip-flop 56, an ascending trigger edge in the switching signal SC by its action on the register 59 results in that counting continues through zero, so that altimately at the outputs of the circuit 58 and of the register 59 a binary number appears which is diminished by one. By way of example, a binary number 010 when combined with the number 111 results in the number 001 which is lower by one.

Form the above it follows that the binary number in the circuit 58 and in the register 59 is a measure of the output voltage of the output voltage of the amplifier 61. Thus the adding circuit 58 and the register 59 together constitute an addition and subtraction circuit (58, 59) in which the register 59 acts as a memory which stores each adjustment until a new adjustment is effected. At the end of an adjustment to the correct position of, or to the signal value in, the measuring location M in the line scanning raster L, when a measurement is made in the binary number is diminished or increased by one and at the next measurement is increased or diminished respectively by one.

In an embodiment of the adjusting unit shown in FIG. 4 the following components are used, which are given in data handbooks:

| Signal comparison device 55 | TCA 230 |
| D flip-flop 56 and register 59 | SN 7474 |
| Signal inverter 57 | SN 7404 |
| Adding circuit 58 | SN 7483 |
| Digital-to-analogue converter 60 | MDA-10Z |
| Amplifier 61 | TBA 221 |

FIG. 5 shows an embodiment of the control pulse source 37 of FIG. 3, FIG. 6a shows signal waveforms illustrating the operation of the source, and FIG. 6b shows a line scanning raster L. Signals are denoted by A1, A2 . . . , A9, time periods by T1, T2 and T3, instants by t1, t2, . . . , t13 and line periods (FIG. 6a) or scanned lines (FIG. 6b) by H1, H2, . . . , H7.

The control pulse source shown in FIG. 5 includes monostable multivibrators 63, 64 and 65 to each of which the line control signal SH is applied. Each multivibrator 63, 64 and 65 is provided with a variable capacitor 66, 67 and 68 respectively which on activation of the relevant multivibrator by the ascending signal edges in the signal SH determines the time required to return to the stable state. The multivibrators 63, 64 and 65 deliver signals A1, A4 and A6 respectively. For the signal A4 the time T2 is such that a descending edge occurs at the middle of the line scanning period. The periods T1 and T3 are shorter and longer respectively by, for example, from 10 to 15 microseconds.

The signals A1, A4 and A6 are applied to D flip-flops 69, 70 and 71 respectively which are activated by descending signal edges. To the D input of each flip-flop 69, 70 and 71 a logical 1 is applied and to the interconnected reset inputs S₂ the signals SH is applied. A logical 0 in the signal SH by being applied to the reset inputs S₂ of a flip-flop 69, 70 or 71 dominantly produces a logical 0 at the Q output, and subsequently a descending signal edge (A1, A4 or A6) applied to the T input produces logical 1 at the Q output. Thus signals A2, A5 and A7 are derived from the signals A1, A4 and A6 respectively of FIG. 6a.

In the circuit of FIG. 5, the line control signal SH and the field control signal SV are applied to a line counting circuit 72 which has a plurality of outputs at which a binary number appears which depends upon the number of lines 8SH) counted from the beginning of a field (SV). The outputs of the line counting circuit 72 are connected to a gate circuit 73 which has three outputs at which gate signals A3, A8 and A9 respectively illustrated in FIG. 6a appear. The gate signal A3 of FIG. 6a comprises a pulse of logical 1 during three line periods H1, H2 and H3, and the instants at which these successive line periods occur in the line scanning raster L are shown in FIG. 6b. Similarly the gate signals A8 and A9 having a line period H4 and line periods H5, H6 and H7 respectively are shown in FIGS. 6a and 6b in the line scanning raster L.

In the circuit of FIG. 5 the gate signal A3 is applied to three NOT-AND gates 74, 75 and 76 to which also is applied the signal A2, A5 and A7 respectively. Through functions $1 \cdot 1 = 0$ and $1 \cdot 0 = 0 \cdot 0 = 1$ the gate 74 derives a signal SCw of FIG. 6a from the signals A2 and A3. In the signal SCw instants t1, t4 and t7 are indicated which also occur in the line periods or lines of the scanning raster L of FIG. 6b. Similarly the signals A5 and A3 by way of the gates 75 produce a signal SCh which has descending edges at instants t2, t5 and t8, which are also shown in FIG. 6b. The signals A7 and A3 by way of the gate 76 produce a signal SCb having descending edges at instants t3, t6 and t9 also shown in the line scanning raster L of FIG. 6b.

Hence in every two interlaced scanning rasters L, i.e. once in each picture, the gate signal A8 includes a pulse of logical 1 during the line period H4. The gate signal 8 and the signal A5 are applied to a NOT-AND gate 77 which from these signals derives a signal SCv which has a descending edge at the instant t10 to which is also shown in the line scanning raster L of FIG. 6b. Furthermore the signal A5 is applied to a NOT-AND gate 78 which is opened by the signal A9 during the three line periods H5, H6 and H7, resulting in a signal SCs having descending edges at instants t11, t12 and t13 (FIG. 6b).

The multivibrators 63, 64 and 65 of the source 37 of FIG. 5 may be of the type SN 74121.

A comparison of the control pulse source 37 of FIG. 5, the signals of FIG. 6a and the instants in the line scanning raster L of FIG. 6b with the adjusting units 38–52 of FIG. 4 shows that at the instants t1 ... t13 the flip-flop 56 transfers the information from the D input to the Q output where it is held, and that at the end of the line periods H1 ... H7 this information is processed in the circuit 58 and the register 59 in that the binary number stored in the register 59 is increased by one and diminished by one respectively.

In the embodiments of the device shown in FIGS. 3, 4 and 5, from the beginning of the adjusting operation all the five adjustments described as effected in every line scanning raster L. It was found in practice that this did not give rise to problems, however, with reference to the sequential adjusting operations described with reference to FIG. 2 there may be derived from the gate circuit 73 of FIG. 5 gates closing signals which initially, during a few line scanning rasters L, permit the signals SCw and SCb only to be generated, after which the signals SCh, SCv and SCc also or only are generated, as the case may be sequentially.

So far adjustments of black level, of peak-white value and of horizontal, vertical and skew distortions have been described. Obviously other adjustments may be carried out, for example adjustment of picture width and picture height, adjustment of linearity in the horizontal and/or vertical scanning directions, etc.

From the above and the test pattern TP of FIG. 1a and particularly from the line scanning raster LB which in FIG. 1b shows vertical displacement it follows that the measuring location Mv in principle should lie in a horizontal strip which comprises the horizontal black band beneath the area w and the horizontal white band beneath the area b (and their continuations), for a blacklevel measurement at the measuring location Mv gives rise to vertical upward displacement, so that in the case of a positional error of a value such that the measuring location Mv falls within the area b this error is increased and not reduced during adjustment. The same applies to the case of a peak-white value measurement with an inherent downwards displacement, if the measuring location Mv lies in the white area beneath the said horizontal black band in the test pattern TP. In practice the above does not give rise to adjusting problems, because adjustment carried out in the factory ensures that the measuring location Mv always lies in the said strip.

The use of more than one measuring point at the measuring locations Mw, Mb, Mh and Ms ensures that owing to the larger number of steps per line scanning raster L the ultimate position having the reference values is reached more rapidly.

As will have been seen, the test pattern TP is used not only for line scanning raster positioning but also for adjustment of the black level and peak-white value. Because the test pattern is used in the ambient light of the scene to be televised, after adjustment the camera is automatically adapted to the scene lighting.

What is claimed is:

1. A method of registering a plurality of color television scanning rasters comprising setting each of the video signals to first and second reference values corresponding to respective first and second measuring locations in respective dark and bright areas of a test pattern, deriving an adjustment signal having a third reference value from a third measuring location disposed at a first transition between said dark and bright areas, and displacing each of said rasters to the location of said transition using said adjustment signal.

2. A method as claimed in claim 1 wherein said deriving step comprises deriving said adjustment signal also from a fourth measuring location disposed at a second bright-dark transition at right angles with respect to said first transition.

3. A method as claimed in claim 2 wherein said deriving step comprises deriving said third measuring signal from a third measuring location having a plurality of measuring points aligned in the field scan direction.

4. A method as claimed in claim 2 wherein said deriving step comprises deriving said adjustment signal from a single point at said fourth location every two interlaced line scanning rasters.

5. A method as claimed in claim 1 wherein said deriving step comprises deriving said adjustment signal also from a fifth measuring location near an edge of the scanning raster.

6. A device for registering a plurality of television scanning rasters of a test pattern having dark and bright areas, said device comprising a comparison circuit having first input means for receiving the picture signals, second input means for receiving first, second and third reference values corresponding to first, second and third measuring locations in said areas and the transition therebetween respectively, and an output means for providing an adjustment signal in accordance with the difference between said first, second and third reference values and said picture signals at said measuring locations respectively; means coupled to said output means for setting the bright and dark areas in the picture signal with respect to the first and second reference values in accordance with said adjustment signal; means coupled to said output means for shifting the position of said raster with respect to said transition in accordance with said adjustment signal; and a control pulse source coupled to said comparison circuit.

7. Device as claimed in claim 6, wherein the control pulse source has a plurality of outputs at which simultaneous control signals are produced, said comparison circuit having a plurality of inputs coupled to said pulse source outputs and a plurality of output means for simultaneous supply of of a plurality of picture signals, which comparison circuit has adjustment units which have storage capabilities 8. Device as claimed in claim 7, wherein each adjustment unit comprises a signal comparison device having inputs to which the picture signal and the reference are applied and an output, a flip-flop having first input coupled to said signal comparison device output and a further input coupled for control to the control pulse source, an adding circuit having at least one input coupled to an output of said flip-flop, a register which comprises a store storing a binary number coupled to said adding circuit.

9. Device as claimed in claim 6 wherein the control pulse source comprises a line counting circuit having inputs to which line and field control signals are applied, a succeeding gate circuit coupled to said line counting circuit and having outputs, a pluralilty of gates having inputs coupled to said succeeding gate, a plurality of flip-flops provided with inputs to which the line control signal and signals obtained from the line control signal and being delayed and lengthened line control signals by means of a plurality of multivibrators are applied and outputs coupled to said gates.

10. Device as claimed in claim 6, further comprising switches which for control are coupled to the control pulse source and for sequential picture signal input and adjustment signal output are coupled to the comparison circuit.

11. Device as claimed in claim 6, further comprising a signal detector means having an input coupled to an output of the comparison circuit in order to detect voltage changes and an ouput coupled to said control pulse source.

* * * * *